Figure 2:
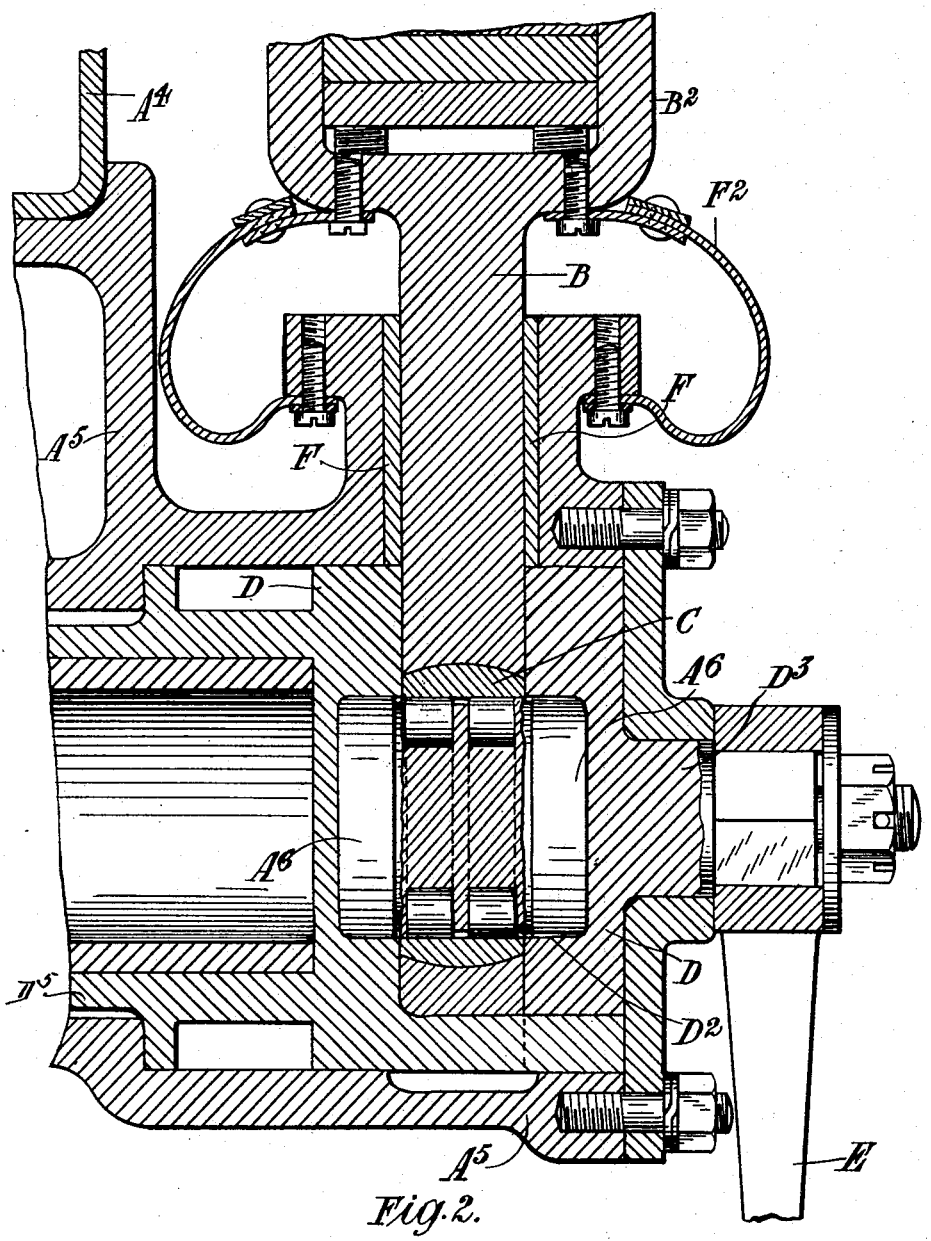

O. D. NORTH.
CANTALIVER SPRING SUCH AS IS USED ON MOTOR VEHICLES.
APPLICATION FILED JAN. 12, 1916.
1,205,560.
Patented Nov. 21, 1916.
2 SHEETS—SHEET 1.
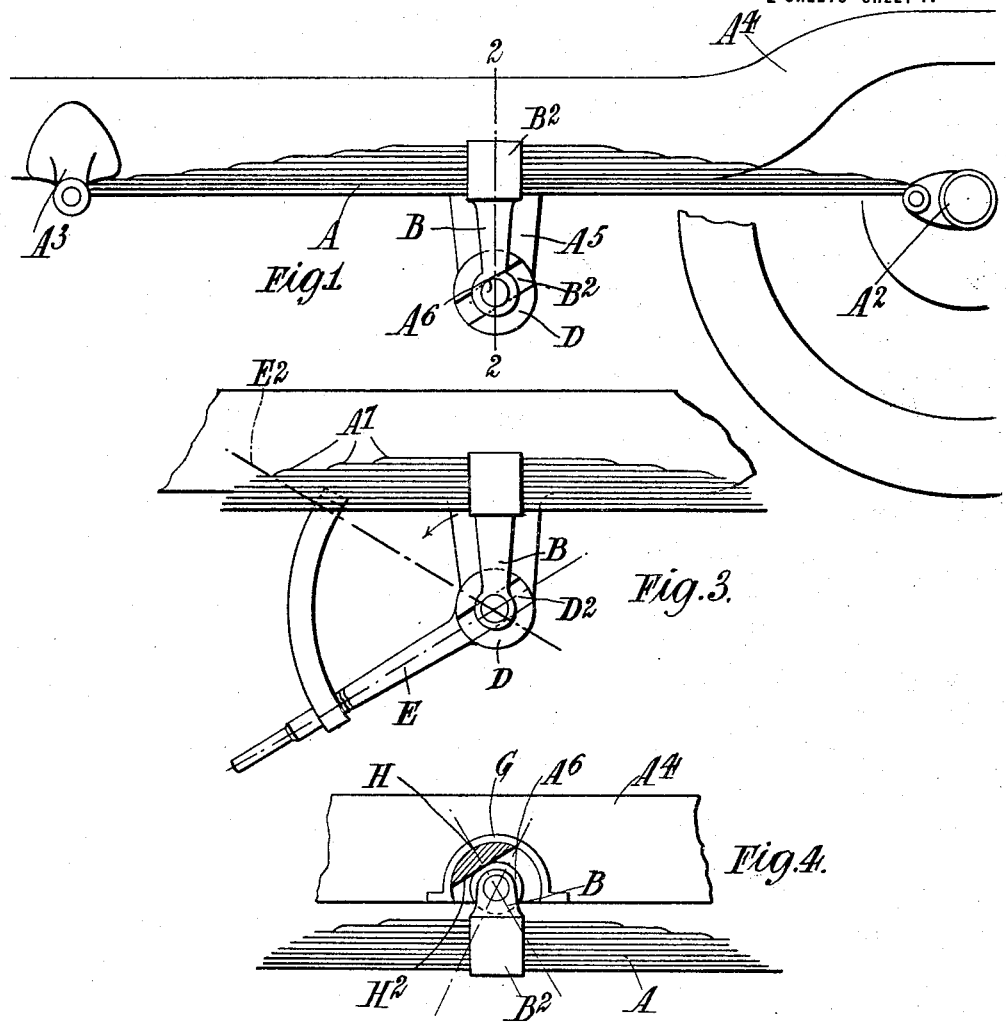
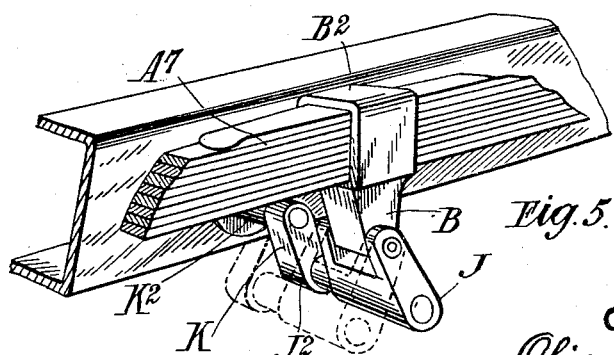
Inventor:
Oliver Danson North
by Alfred Unite,
atty

UNITED STATES PATENT OFFICE.

OLIVER DANSON NORTH, OF CHELSEA, ENGLAND.

CANTALIVER-SPRING SUCH AS IS USED ON MOTOR-VEHICLES.

1,205,560.  Specification of Letters Patent.  Patented Nov. 21, 1916.

Application filed January 12, 1916. Serial No. 71,631.

*To all whom it may concern:*

Be it known that I, OLIVER DANSON NORTH, a subject of the King of Great Britain, and resident of Chelsea, in the county of Middlesex, England, have invented certain new and useful Improvements in Cantaliver-Springs Such as Are Used on Motor-Vehicles, of which the following is a specification.

This invention relates to cantaliver springs and it has for its object to provide simple means for varying the stiffness of such springs when in position on a vehicle to suit changes of load.

According to this invention, the center, or that part of the spring which normally carries the fulcrum, is provided with an approximately vertical stem, and the connection between this stem and the frame is adjustable so that the load reaction on the spring is either perpendicular or at angle thereto. For instance, the stem may carry a cross pin engaging slots in a movable member carried by the vehicle frame. The movement of this member is such that an angular force can be applied to the stem in either direction, so that the bending moment on the forward part of the spring can be increased or decreased. In this way the stiffness of the spring can be adjusted over a wide range.

In the accompanying drawings, Figure 1 is a side elevation showing diagrammatically part of the rear of a motor vehicle frame provided with an adjustable cantaliver spring constructed in accordance with this invention. Fig. 2 is an enlarged detail view taken on the section line 2—2 of Fig. 1. Fig. 3 shows diagrammatically one method of adjusting the spring effect. Fig. 4 is a side view showing a modification, and Fig. 5 is a perspective view illustrating a further alternative.

Like letters indicate like parts throughout the drawings.

In the construction illustrated in Figs. 1, 2 and 3 a cantaliver spring A connects the rear axle $A^2$ with a bracket $A^3$ on the frame $A^4$. The frame is also provided with a bracket $A^5$ which indirectly carries the trunnion $A^6$ upon which the spring rocks.

The spring is provided with a stem B which conveniently is formed with a band or clip $B^2$ embracing the spring at or near its center. It is immaterial whether this stem B projects above or below the spring. In the construction shown in Fig. 4 it projects above and in Fig. 5 it is shown below, as is the case in Figs. 1–3. The actual trunnion $A^6$ consists of a cross pin projecting at each side of the stem B as can best be seen in Fig. 2. Preferably the cross pin is provided with a sleeve mounted upon suitable bearings running in a parti-spherical collar C taking a bearing in the stem B. This cross pin $A^6$ is thus free to tilt if necessary and this pin can revolve freely if necessary.

The projecting pin parts $A^6$ engage slots or grooves $D^2$ in a pair of disks D. The two disks are connected together in any suitable manner and the outer one is formed with a boss $D^3$ which carries an operating lever E. By moving this lever, which may project within reach of the driver, the disks may be partially rotated and the grooves $D^2$ moved into various positions.

It will be seen that the disks D are carried by the bracket $A^5$ on the frame and that the vehicle load acts downward through this bracket and the disks and is transmitted through the upper side of the grooves $D^2$ and cross pin $A^6$ to the stem B and to the spring. When the grooves $D^2$ are at right angles to the stem B the reaction due to the load is perpendicular and the spring functions normally. By depressing the lever E into the position shown in Fig. 3 or by similarly inclining the grooves $D^2$ in any suitable manner the load reacts angularly, tending to tip the arm B in the direction of the arrow shown in Fig. 3. Thus the bending moment on the front half $A^7$ of the spring is increased, producing the result of a weaker spring. By raising the lever E into the position of the dotted line $E^2$ the reverse effect is produced and the spring effect is stiffened.

Preferably the two inner disks D, that is to say the two nearest the frame, are connected together by means of a tube $D^5$ so that it is only necessary to move a lever E or the equivalent from one side of the vehicle when adjustment of both springs will be effected.

The stem B may slide in bearings F carried by the bracket $A^5$ and a flexible casing $F^2$ may inclose the stem to prevent the entry of water and mud and loss of lubricant.

Any suitable locking device may be provided for the lever E.

In the construction shown in Fig. 4, the frame $A^4$ carries a circular housing G inside which is carried a block H. This block can be adjusted around the inside of the housing G so that its under surface $H^2$ which bears upon the cross pin $A^6$ may either lie perpendicular to the stem B or at an angle thereto. By this means the load reaction may be adjusted for the purpose described.

In the arrangement shown in Fig. 5 the stem B is connected with a link J and this is carried by a short spindle $J^2$ suspended from a swinging arm K. The arm is carried by a spindle $K^2$, and this may extend across the vehicle carrying at the other side a similar arm K connected with the spring on that side. The spindle $K^2$ is carried by the bracket $A^5$ on the frame and it can be twisted by any convenient means so as to bring the link J into the position shown in dotted lines, or to hold it in an intermediate position. The load acts downward through the link J and the upward reaction is either perpendicular to the link B, or there is an angular resultant which varies the bending moment on the forward part $A^7$ as in the previous constructions.

Alternatively the stem in either of the constructions may be forked and there may be a single disk D in between the forked parts carrying grooves at both sides engaged by quadrants on the parts $A^6$ carried on the forks. The construction is the reverse of that described in Figs. 1 and 3, but the operation is the same.

By this invention it is possible to adjust the spring effect to suit widely different loads without difficulty, and instantaneously, if necessary from the driver's seat and without disturbing the passengers.

With regard to the stem, it will be clear that the load must act upon some part projecting from the main or master leaf of the spring. In most cases a pronounced stem such as B, Figs. 1, 2 and 3, can be used, but in other instances, as is shown in Fig. 5, the apparent length of the stem is almost negligible, but it is essential that the point of application of the load, that is to say, in the case shown in Fig. 5, the roller, must be suitably spaced from the master leaf. Where the roller is arranged above the spring the apparent length of the "stem" is practically negligible.

What I claim as my invention, and desire to secure by Letters Patent of the United States is:—

1. In a cantaliver spring, an attachment at one end to the vehicle frame, an attachment at the other end to the axle, a stem carried by said spring, a cross pin on said stem, and an adjustable member carried by the frame having a surface bearing upon said cross pin.

2. In a cantaliver spring, an attachment at one end to the vehicle frame, an attachment at the other end to the axle, a stem carried by said spring, a cross pin on said stem, a disk carried by the frame, a groove in said disk with which said cross pin engages, and means for adjusting said disk.

3. In a cantaliver spring, an attachment at one end to the vehicle frame, an attachment at the other end to the axle, a bracket on said frame, a pair of connected grooved disks carried by the said bracket and adapted to turn therein, a stem carried by said spring and guided in said bracket, a cross-pin on said stem projecting on both sides thereof and engaging the grooves in said disks, and a lever connected with one of said disks for adjusting both disks relative to said cross-pin.

4. In a cantaliver spring, an attachment at one end to the vehicle frame, an attachment at the other end to the axle, a bracket on said frame, a pair of connected grooved disks carried by the said bracket and adapted to turn therein, one pair of disks being provided on each side of the said frame, a stem carried by said spring and guided in said bracket, a cross-pin on said stem projecting on both sides thereof and engaging the grooves in the respective disks, a lever connected with one of said disks for adjusting them relative to said cross-pin, and a tubular member connecting the two inner disks on both sides of the said frame permitting simultaneous adjustment of all the disks.

In testimony whereof I have signed my name to this specification.

OLIVER DANSON NORTH.

Copies of this patent may be obtained for five cents each, by addressing the "Commissioner of Patents, Washington, D. C."